G. W. KINZER.
Combined Planter and Cultivator.
No. 81,177.
Patented Aug. 18, 1868.
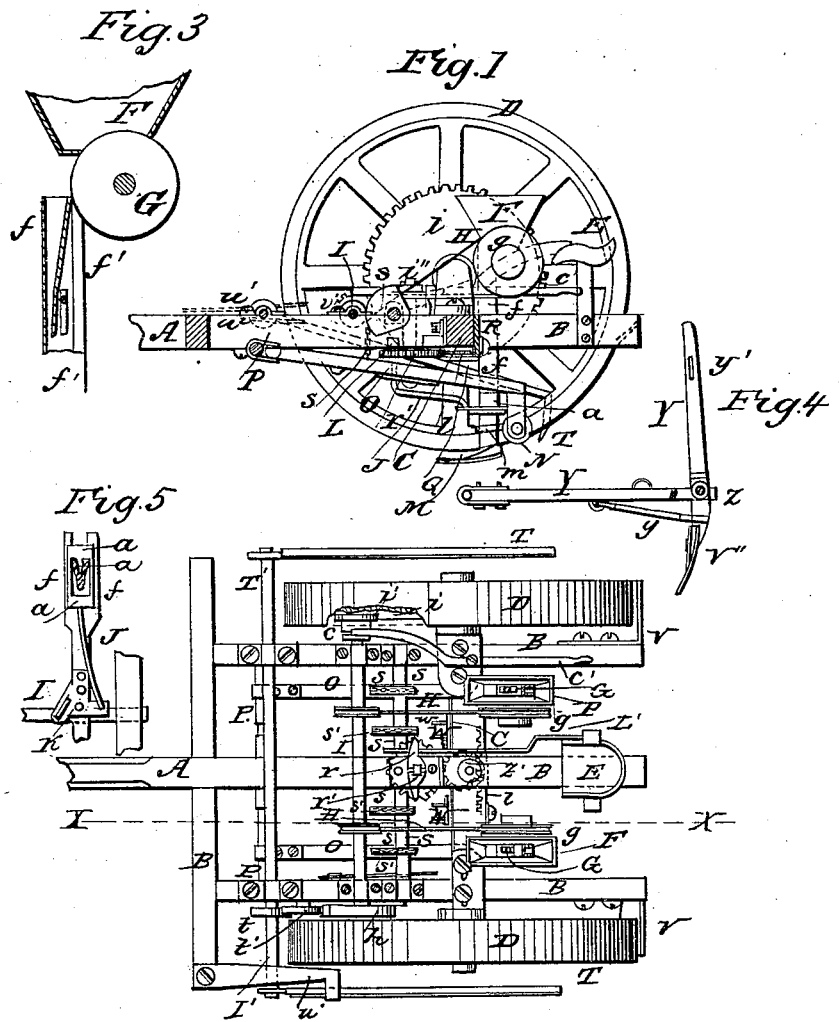

United States Patent Office.

GEORGE W. KINZER, OF LINDEN STATION, OHIO.

Letters Patent No. 81,177, dated August 18, 1868.

IMPROVEMENT IN COMBINED PLANTER AND CULTIVATOR.

*The Schedule referred to in these Letters Patent and making part of the same.*

TO ALL WHOM IT MAY CONCERN:

Be it known that I, GEORGE W. KINZER, of Linden Station, in the county of Ross, and State of Ohio, have invented a new and improved Combined Corn-Planter and Cultivator; and I do hereby declare that the following is a full, clear, and exact description of the construction and operation of the same, reference being had to the accompanying drawings, making a part of this specification, in which—

Figure 1 is a longitudinal vertical section.

Figure 2 is a top view.

Figure 3 is a cross-section through the seed-box.

Figure 4 is a detached view of one of the cultivator-plows.

Figure 5 is a detached view of the valve that regulates the dropping of the seed.

The object of this invention is to provide a combined corn-planter and cultivator, which shall be economical in construction and convenient of operation.

In the drawings, A indicates the draught-beam; B, the frame; C, the axle; D D, the draught-wheels; E, the driver's seat; and F F, the seed-boxes.

The corn is dropped from the seed-boxes into tubes, $f f$, by means of notched wheels, G G, operating under the seed-boxes, and forming the bottom of the same, said wheels being driven by pulleys, $g g$, actuated by means of a crossed belt, H, from a shaft, I, to which motion is communicated from the draught-wheels by gearing $i i'$.

A clutch, $c$, is provided, so that, by means of a lever, $c'$, the driver can put the seeding-apparatus above described into or out of gear at pleasure.

The corn, dropped from the seed-box F into the tubes $f f$, is stopped by a valve, $a$, until a sufficient quantity collects to seed a hill, when the valve is withdrawn by means of an arm, J, bell-crank, K, and sliding bar, L. The end of the sliding bar is struck and pushed back and forth by a cam, $h$, attached to the shaft I, or to the side of a wheel on that shaft, and a spring, $b$, operating in the opposite direction.

The seed thus dropped passes down through the tube, falling at the heel of the opening-plows M M, and being covered by the earth falling back behind the plows. Rollers N N may be attached behind the plows, to pass over the hills and slightly press the ground, if desired, or the machine may be operated without them.

The tubes $f f$ form the standards of the plows M M, and slide up and down in guides $f' f'$, so as to allow the plows to rise and fall with the inequalities of the ground.

Beams O O are attached to the plow-standards $f f$, and at their forward end pivoted upon or hinged to a rock-shaft, P, which allows the beams to swing up and down with the plows. The beams, just in front of the plow-standards, are also attached to a slide, Q, which works across the machine, and serves to move the plows laterally, when the machine is operated as a cultivator.

The slide has a rack, $r$, upon one side, which gears with spur-wheels $r' r'$, to the shaft or spindle of one of which foot-rests $r'' r''$ are provided, by which the operator can, with a movement of his foot, throw the whole set of plows to one side or the other, as may be necessary.

S is a shaft, provided with arms or eccentrics, $s s$, which are connected to the plow-beams O O by cords, $s' s'$. By means of a lever, L', alongside of the seat, the driver may rock the shaft S, and lift or depress the plows at pleasure.

T T are markers, attached to the ends of a rock-shaft, T', which is provided with a gear-wheel, $t$, gearing with another small one, $t'$, behind it. A spur, $e$, upon the rim of the cam-wheel $h$, engages with the cogs of the wheel $t$ once at every revolution of the shaft I, and thus depresses the markers.

When the shaft rotates so far as to disengage the spur, the markers may rise by the operation of a spring, $u$, being kept from springing up too far by another spring, $u'$.

V V are scrapers, to remove the dirt from the rim of the draught-wheels, and prevent them from becoming clogged and heavy.

*w w* are sockets, attached to and supported by the slide Q, for holding the standards of the cultivator-plows, when such are used. They may be set nearer or farther apart by means of set-screws *w' w'*.

When the machine is employed as a cultivator, the seed-box and its connected apparatus, the markers, &c., may be removed, and cultivator-plows inserted in the sockets *w w*, and in place of the plows M M.

Such cultivator-plows, with the standards and beams, are clearly shown in fig. 4, in which Y is the beam; Y', the standard, hinged to the beam at Z; Y'', the plow; and *y*, a brace, connecting the plow to the beam. The standards pass through the sockets above, and are keyed in place by means of the slots *y''*. The whole draught of the plow is thus thrown on the beam, and none whatever on the standards, the latter serving merely to keep the plows from lateral movement. The joint at *z* accommodates them to yield and throw any forward or backward pressure entirely upon the beam.

The shape of the planter-plows is clearly seen in fig. 1. By comparing these, as shown in this figure, with the cultivator-plows, as shown in fig. 4, their radical difference in construction and operation will be at once perceived, the latter being nearly vertical, in order to throw the earth sideways; the former having their blades or moulds nearly horizontal, in order to lift the earth and allow it to fall back upon the seed.

The beams of the two plows are very much alike, and are attached to and supported by the rock-shaft P in precisely the same manner.

To the sides of the standards *f f*, just above the plows M M, are attached wings, *m m*, between which and the mould-board of the plow is a narrow space. The wings *m m* may be movable up and down on the standard by means of set-screws or otherwise. Their object is to keep clods from falling on the corn, and to regulate the depth of the earth which covers the seed.

Having thus described my invention, what I claim as new, and desire to secure by Letters Patent, is—

1. The combination of the plow Y'', beam Y, and standard Y', hinged at *z*, substantially as described.

2. The combination of the distributing-apparatus G H I with the valve *a*, arm J, sliding bar L, and cam-wheel *h*, substantially as described.

3. The combination of the markers T T with the springs *u u'*, the shaft T', gearing *t t'*, and spur *e*, substantially as described.

4. The combination of the slide Q with the gearing *r r'*, foot-rest *r''*, and plow-standards *f f* or Y', substantially as described.

To the above specification of my improvement I have signed my hand, this 18th day of May, 1868.

GEO. W. KINZER.

Witnesses:
 CHAS. A. PETTIT,
 SOLON C. KEMON.